July 17, 1962   B. V. ZELMANN   3,044,742
GATE VALVE WITH FRONTALLY ENGAGING SEALING MEANS
Filed April 16, 1959

INVENTOR.

United States Patent Office 3,044,742
Patented July 17, 1962

3,044,742
GATE VALVE WITH FRONTALLY ENGAGING SEALING MEANS
Bruno Vitta Zelmann, % Continental Patents Company, Via Meravigli 16, Milan, Italy
Filed Apr. 16, 1959, Ser. No. 806,844
Claims priority, application Italy Apr. 29, 1958
3 Claims. (Cl. 251—197)

This invention concerns a gate valve with frontally engaging sealing means.

Gate valves are known in which the sealing means during their closing and opening movements translate more or less perpendicularly with respect to the fluid flow passing through the valve.

In these known valves, the fluid is not compelled to deviate from the rectilinear direction of its flow during the passage through the valve, and when the valve is opened the resistance to the passage of the fluid is very small. These known gate valves have, however, the serious inconvenience in that, owing to the perpendicular displacement of the sealing means with respect to the wall of the valves conveying the fluid, the sealing engagement of the sealing means occurs laterally and cannot be made tighter by a greater pressure of the sealing means towards the closing direction thereof, since the sealing means abut only against half the closing contour defined by the contacting sealing surfaces.

With these valves it is not possible completely to prevent the leakage of the fluid through the valve.

Valves are also known in which the sealing engagement occurs frontally. The expression "frontally" or "frontal" as hereinafter employed, refers to a functional zone facing the valve seat and axially extending thereto. In these valves with frontal sealing engagement the fluid is, however, compelled to change its flow direction and the sealing means move in a direction parallel with respect to the flow direction, while the sealing engagement, at the opening defined by the valve seat, occurs frontally with respect to said opening. Such valves provide a completely hermetical sealing, but the internal configuration of the valves and the compelled deviation of the flow cause a great head drop and consequently a great energy loss of the flowing fluid.

Attempts have been made to eliminate the drawbacks of these known valves. However, the improved valves had a very complicated structure, were very expensive and did not succeed in eliminating completely the mentioned drawbacks.

An object of the present invention is, therefore, to provide a valve designed to eliminate completely the drawbacks of known valves.

Another object of the invention is to provide a valve device which possesses, within a single apparatus, the advantages both of gate valves and of valves with frontal engagement sealing, and which at the same time eliminates the drawbacks of these valves.

Another object is to provide a valve means which does not compel the fluid to deviate from its rectilinear flow direction during the passage of the fluid through the valve.

Still another object of the invention is to provide a valve the maximum aperture area of which is at least equal to the passage area of the duct in which the valve is interposed.

Another object of the invention is to provide a device of the specified type which is made up of a few and simple but efficient elements, which may be easily manufactured, mounted and handled so as to obtain a considerable reduction in cost.

These and other objects which will be apparent from the following description, are attained with the inventive gate valve device, comprising sealing means which are movable with respect to the gate means and having a substantially rectilinear passage for the fluid, which device is characterized in that at the end of the gate means, sealing means are provided which are removably carried by the gate means and which are movable substantially transversely with respect to the displacing path of the gate means, the inventive device being further characterized in that, co-axially with respect to the gate means, an expander member is provided, which is movable in the displacing direction of the gate means and is adapted to spread away said sealing means by means of an inclined plane engagement, substantially in a direction transverse with respect to the displacement path of the gate element, in order tightly and frontally to press said sealing means against the peripheral surface of the passage opening for the fluid, which passage extends substantially transverse with respect to the running path of the gate member.

The invention will now be more fully described with reference to one embodiment thereof given only for indicative and not for limitative purposes, which is represented in the accompanying drawing in which.

Figure 1:
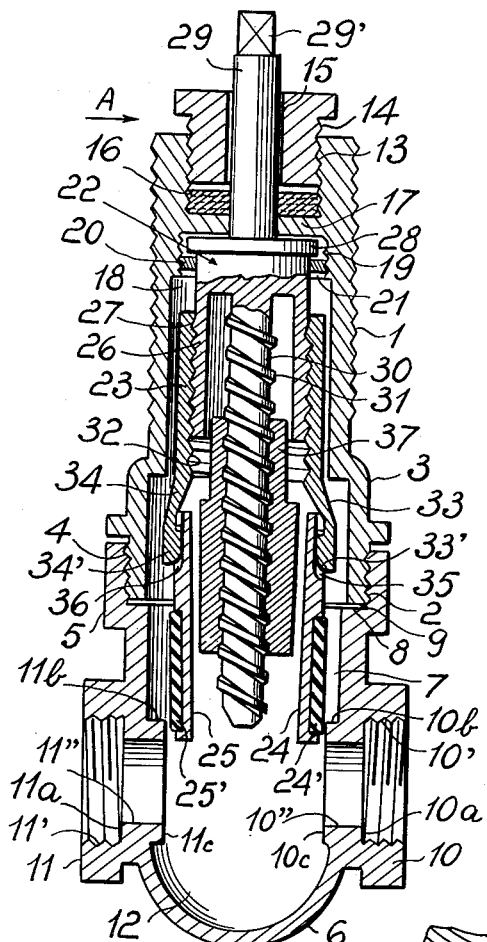
FIG. 1 shows an axial sectional view through the embodiment of the valve device according to the invention.
Figure 2:
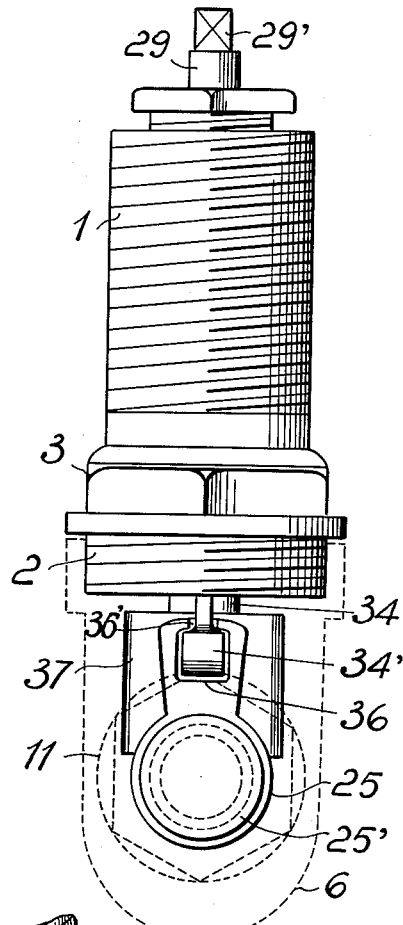
FIG. 2 is an elevation view, in the direction of the arrow A, of the upper body portion of the valve device, showing partially the sealing and expander members, in which the phantom lines indicate the lower body portion of the valve.
Figure 3:
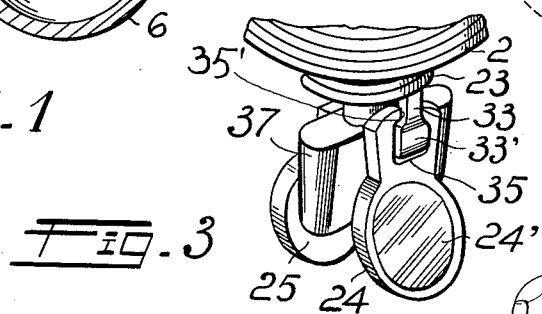
FIG. 3 is a fragmentary perspective view of the sealing and expander members of the valve.

With reference to the drawing, the valve according to the invention is formed by a hollow upper cylindrical body 1 screwed, by means of an external screw thread 2 of its slightly widened lower end 3, within the inner threaded portion 4 of the neck 5 of the lower body portion 6 of the inventive device. The threaded upper part 4 of the neck 5 has an inner diameter which is greater than the inner diameter of the adjacent lower part 7 of the neck 5 and approximately corresponds to the inner diameter of the widened end 3 of the upper body portion 1, so that between the upper and the lower parts of the neck 5 an annular shoulder 8 is formed, facing the frontal surface 9 of the body 1 thus allowing the arrangement between the shoulder 8 and the surface 9 of an annular packing which is not represented in the figure. The body 6 has two flanged mouth pieces 10 and 11 provided with internal threads 10' and 11' for connecting therewith the inlet and the outlet pipes for the fluid. The diameter of the passage opening 10" and 11" is slightly smaller than the diameter of the threads 10' and 11', respectively, so as to form annular shoulders 10a and 11a for eventual packing means which are not represented in the figure. The tubular openings 10" and 11" end within the interior of the compartment 12 of the valve, with cylindrical projections 10b and 11b respectively which extend from the internal wall of compartment 12 and have frontal annular surfaces 10c and 11c, forming valve seats surrounding the openings 10" and 11".

The upper hollow cylindrical body portion 1 has on its upper extremity a bore 13 provided with an internal thread wherein an externally threaded stuffing nut 14 is screwed. The stuffing nut is provided with an axial bore 15 and presses against a stuffing packing 16 which abuts against an internal flange 17 of the bore 13, the flange 17 having a central bore and being an integral part of the body 1. Below the internal flange 17, the body 1 has a cylindrical cavity 18 whereof one part, which is adjacent to the internal flange 17, has a diameter slightly smaller than that of the remaining portion of the cavity 18, and is provided with a slightly conical locking thread 19 to allow a washer 20, having an external thread, to be lockingly screwed therein.

The externally threaded washer 20 is provided with a diametral groove 21 for enabling the screwing operations to be executed by means of a screwdriver.

The cylindrical cavity 18 increases in its diameter at the end 3 of the body 1.

The controlling spindle member 22 for the gate member 23 and for the sealing elements 24 and 25, is formed of a hollow cylindrical body 26 provided with an external screw thread 27 and terminating at its upper end with a flange 28 from which a rod 29 axially extends as an integral part of the said flange and is provided at its upper end 29' with a square cross section for the engagement with a control wheel or with a control wrench which are not represented in the figure.

From the inner side of the end of the hollow cylindrical body 26, a stem 30 extends downwardly and is provided with a screw thread 31 having a pitch which is substantially greater than the pitch of the screw thread 27 of the cylindrical body 26. As clearly seen in FIG. 1, between the inner wall of the hollow cylindrical body 26 and the stem 30 a free annular space is formed. The gate member 23 has a cylindrical form and is provided with an internal thread 32 by means of which this cylindrical gate member 23 is screwed on the cylindrical body 26. The lower end of the gate member 23 has downwardly projecting arms 33 and 34 having heads 33' and 34'. The heads 33' and 34' are slightly widened and rounded off. At the end part of the sealing elements 24 and 25 recesses 35 and 36 are provided. Said recesses have reduced throats 35' and 36'. In the recesses 35 and 36 the heads 33' and 34' are loosely received. Thus, between the sealing members 24 and 25, and the gate member 23 a removable hinged connection is formed. The sealing members 24 and 25 are in the form of discs and have a circular recess for fitting therein packings 24' and 25' of rubber or other similar packing materials. On the threaded stem 30 there is screwed an expander member 37 which has the form of a rectangular frusto conical prism provided with an internally thread bore adapted to form a sliding fit with the thread 31 of the stem 30.

Both the screw thread 31 and the screw threads 27 and 32 are left handed.

The cylindrical gate member 23 is prevented from making a full rotation about its axis because of the sealing members 24 and 25. In fact, the lateral extension of the sealing members 24 and 25 is such that their full rotation together with cylindrical gate 23 about the longitudinal axis of said gate is prevented by the internal wall 7 of the inner compartment of the valve. The existing clearance between discs 24, 25 and wall 7 allows only a negligible rotation of the cylindrical gate 23. The same is true of the expander member 37, the lateral extension of which prevents its rotation by virtue of an abutment which takes place, during an attempt at a rotation, against the discs 24 and 25 which themselves, as already mentioned above practically cannot rotate, so that the expander member 37 practically cannot rotate, except to the negligible extent allowed by existing clearances.

The operation of the inventive valve device is obvious. By rotating the cylindrical body 22 in a clockwise direction, by means, for instance of a control wheel or a control wrench applied to the rod 29, owing to the fact that neither the cylindrical gate 23 nor the frusto-conical expander 37 can rotate, these last two members move downwardly because of the left hand arrangement of the threads through which they matingly engage the cylindrical body 26 and the stem 30, which stem, as mentioned above, is an integral part of the cylindrical body 26 and consequently rotates together with the said body. Now owing to the fact that the pitch of the screw thread 31 is greater than the pitch of the screw threads 27 and 32, a relative movement is obtained between the expander 37 and the sealing discs 24 and 25. Expander 37 thus moves downwardly more rapidly than the sealing discs 24 and 25, so that in a predetermined moment the expander 37 engages the sealing discs 24 and 25 and, owing to its conical shape, spreads them away during the continuation of its run, so that the said sealing discs, in the closing position of the valve, are vigorously pressed against the sealing surfaces or seats 10c and 11c surrounding the openings 10" and 11", thus obtaining a fluid tight closure at both openings.

It is obvious that the screw threads are calculated in a manner that the relative movements of the expander and of the sealing discs occur in a functionally convenient way.

By rotating the rod 29 in a counter clock-wise direction, both the sealing discs 24 and 25 and the cylindrical gate 23 as well as the expander 37, will move upwardly. Owing to the fact that the pitch of the screw thread 31 which shifts the expander 37, is considerably greater than the pitch of the screw thread 27 which controls the movement of the cylindrical gate 23 together with the sealing discs 24 and 25, after a slight angular rotation of the spindle member 22 and consequently after a minimum upward movement of the sealing discs 24 and 25, which movement is allowed in virtue of the elasticity of the packings 24' and 25' which, at the beginning of the opening operation of the valve are pressed against the seats 10c and 11c surrounding the passage openings 10" and 11", the expander 37 disengages the sealing discs 24 and 25 and these discs disengage, together with their packings 24' and 25', from the sealing surfaces 10c and 11c so that a free upward motion of the gate member may take place.

It is to be intended that the described valve device may be subjected to various modifications without departing from the scopes of the invention. Thus, for example, it is possible to provide, in substitution of the sealing discs which are hinged on the cylindrical gate member, equivalent members such as sealing pistons guided within radial bores provided within the wall of the cylindrical gate and actuated by means of the frusto-conical expander member, which in turn may have other equivalent shapes.

I claim:

1. A gate valve comprising a casing having coaxially arranged an inlet opening and an outlet opening with valve seats surrounding said inlet opening and said outlet opening, a spindle member extending within said casing and rotatable about its center line extending transversally to the axis of said coaxially arranged inlet and outlet openings, said spindle member having a threaded stem coaxial therewith and providing a first screw thread and a threaded hollow cylindrical part coaxial therewith and providing a second screw thread, said threaded hollow cylindrical part spacingly surrounding a length of said stem to leave a free annular space between said stem and said hollow cylindrical part, said first screw thread and said second screw thread having different pitches, a threaded tubular gate member having a free end and matingly and slidably engaging with its threads said second screw threads of said hollow cylindrical part, sealing discs removably hinged on the free end of said gate member and movable therewith, an expander member having a threaded bore mating and slidably engaging with its threads said first screw-threads of said threaded stem and inclined wedge-like surfaces on said expander member to spread apart said sealing discs against said valve seats when said expander member and said sealing discs are in a predetermined position with respect to said valve seats, and means incorporated in said casing to prevent rotation of said gate member and said expander member during rotation of said spindle member to allow a relative rotation of said second screw-thread with respect to said gate member and of said first screw thread with respect to said expander member, said expander member and said gate member are so related and said different pitches of the screw threads are so related in such a manner that when the spindle is rotated from the full open position of the gate member the gate member will move toward the seats at a slower speed then the expander member and when the sealing discs are in a predetermined position adjacent said seats the expander member will press the sealing discs against the valve seats.

2. A gate valve comprising a casing having coaxially arranged an inlet opening and an outlet opening with valve seats surrounding said inlet opening and said outlet opening, a spindle member extending within said casing and rotatable about its center line extending transversally to the axis of said coaxially arranged inlet and outlet openings, said spindle member having a threaded stem coaxial therewith and providing a first screw thread and a threaded hollow cylindrical part coaxial therewith and providing a second screw thread, said threaded hollow cylindrical part spacingly surrounding a length of said stem to leave a free annular space between said stem and said hollow cylindrical part, said first screw thread and said second screw thread having different pitches, a threaded tubular gate member having a free end and matingly and slidably engaging with its threads said second screw threads of said hollow cylindrical part, sealing discs removably hinged on the free end of said gate member and movable therewith, an expander member having a threaded bore matingly and slidably engaging with its threads said first screw threads of said threaded stem and inclined wedge-like surfaces on said expander member to spread apart said sealing discs against said valve seats when said expander member and said sealing discs are in a predetermined position with respect to said valve seats, said expander member having at least one portion thereof of a minor diameter than the outer diameter of said free annular space to allow said one portion of the expander member to enter in said free annular space when the expander member is in one of its extreme positions, and means incorporated in said casing to prevent rotation of said gate member and said expander member during rotation of said spindle member to allow a relative rotation of said second screw-thread with respect to said gate member and of said first screw thread with respect to said expander member, said expander member and said gate member are so related and said different pitches of the screw threads are so related in such a manner that when the spindle is rotated from the full open position of the gate member the gate member will move toward the seats at a slower speed then the expander member and when the sealing discs are in a predetermined position adjacent said seats the expander member will press the sealing discs against the valve seats.

3. A gate valve as claimed in claim 2, wherein said sealing discs have gaskets of rubber-like material to engage said valve seats when said discs are spread apart against said valve seats.

References Cited in the file of this patent
UNITED STATES PATENTS

| | | |
|---|---|---|
| 321,807 | Galvin | July 7, 1885 |
| 392,961 | Lynch | Nov. 13, 1888 |
| 904,056 | Farrell | Nov. 17, 1908 |
| 1,300,200 | Snow | Apr. 8, 1919 |
| 1,512,431 | Trowe | Oct. 21, 1924 |
| 2,198,639 | Stines | Apr. 30, 1940 |
| 2,224,939 | Volpin | Dec. 17, 1940 |

FOREIGN PATENTS

| | | |
|---|---|---|
| 2,451 | Great Britain | Dec. 9, 1893 |